US009350729B2

(12) United States Patent
Novak (10) Patent No.: US 9,350,729 B2
(45) Date of Patent: May 24, 2016

(54) BIFURCATED AUTHENTICATION TOKEN TECHNIQUES

(71) Applicant: Microsoft Technology Licensing, LLC, Redmond, WA (US)

(72) Inventor: Mark F. Novak, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/284,221

(22) Filed: May 21, 2014

(65) Prior Publication Data

US 2015/0341346 A1 Nov. 26, 2015

(51) Int. Cl.
*H04L 29/06* (2006.01)

(52) U.S. Cl.
CPC ........ *H04L 63/0853* (2013.01); *H04L 63/0807* (2013.01); *H04L 63/0884* (2013.01); *H04L 63/10* (2013.01)

(58) Field of Classification Search
USPC ...................................... 726/5, 8, 9
See application file for complete search history.

(56) References Cited

U.S. PATENT DOCUMENTS

| 7,607,008 | B2 | 10/2009 | Howard et al. |
| 8,255,984 | B1 | 8/2012 | Ghostine et al. |
| 8,516,566 | B2 | 8/2013 | Srinivas |
| 2003/0188193 | A1 | 10/2003 | Venkataramappa |
| 2010/0024013 | A1 | 1/2010 | Cheng et al. |
| 2010/0077216 | A1* | 3/2010 | Kramer et al. ............. 713/172 |
| 2011/0252459 | A1 | 10/2011 | Walsh et al. |
| 2012/0324556 | A1* | 12/2012 | Yefimov et al. ............. 726/7 |
| 2012/0331535 | A1 | 12/2012 | Anderson |
| 2014/0223527 | A1* | 8/2014 | Bortz et al. ............. 726/6 |

FOREIGN PATENT DOCUMENTS

WO WO-2013106688 7/2013

OTHER PUBLICATIONS

"Reverse fuzzy extractors: Enabling lightweight mutual authentication for PUF-enabled RFIDs"; Van Herrewege et al; 2012—Springer, 16 pages.*

(Continued)

*Primary Examiner* — Jason Lee
(74) *Attorney, Agent, or Firm* — Timothy Churna; Judy Yee; Micky Minhas (57) ABSTRACT

Bifurcated authentication token techniques are described in which sign-on credentials are separated from corresponding privilege data for resources. During client authentication, a determination is made regarding whether a service provider is configured to support bifurcated authentication token techniques. If the techniques are supported, a lightweight token is issued to the client and corresponding privilege data is stored separately from the token in a centralized authentication database. If a service provider does not support bifurcated authentication token techniques, a traditional, combined authentication token that includes privilege data is issued to the client. The lightweight token contains identity information and a reference to the privilege data, but does not contain the actual privilege data. Therefore, the lightweight cookie token alone is not sufficient to gain access to corresponding resources. Moreover, privileges associated with a lightweight token may be revoked or altered without having to change or invalidate the lightweight token itself.

20 Claims, 7 Drawing Sheets

(56) References Cited

OTHER PUBLICATIONS

"A lightweight mutual authentication protocol for RFID networks"; Luo et al; 6 pages Proceedings of the 2005 IEEE International Conference on e-Business Engineering (ICEBE'05) © 2005 IEEE.*

Jian, "An Improved Scheme of Single Sign-on Protocol", In Proceedings of Fifth International Conference on Information Assurance and Security, Retrieved from <http://ieeexplore.ieee.org/xpl/articleDetails.jsp?tp=&arnumber=5284244&matchBoolean%3Dtrue%26searchField%3DSearch_All%26queryText%3D%28%28single+sign+on%29+AND+ticket+server%29>,Aug. 18, 2009, 4 pages.

International Search Report and Written Opinion, Application No. PCT/US2015/031287, Aug. 17, 2015, 10 Pages.

"Enabling Custom Authentication", Commerce Server 2000—Retrieved at: https://msdn.microsoft.com/en-us/library/ee811566%28v=cs.10%29.aspx, 2 pages.

"Authentication Tickets", Commerce Server 2000—Retrieved at: https://msdn.microsoft.com/en-us/library/ee824848%28v=cs.10%29.aspx, 2 pages.

"Cookies and Authentication", Commerce Server 2000—Retrieved at: https://msdn.microsoft.com/en-us/library/ee799134%28v=cs.10%29.aspx, 4 pages.

Brundrett,"Kerberos authentication in Windows NT 5.0 domains", In USENIX—login magazine in 1998 on Kerberos, 1998, 7 pages.

* cited by examiner

BIFURCATED AUTHENTICATION TOKEN TECHNIQUES

BACKGROUND

Computing device users may use local and online accounts to access various computing resources. Users may seek access to their accounts from different devices and may also share devices to access respective accounts. Authentication of users to prove the users "are who they say they are", differentiate between users, and provide selective access to computing resources is a persistent challenge faced by service providers. Traditionally, authentication techniques may rely upon shared secrets such as passwords and/or digital tokens (e.g. ticket granting tickets TGTs, encrypted blobs, cookies, or other sign-on credentials). However, shared secrets and digital tokens can be stolen or compromised. Moreover, traditional tokens may include both identity and privilege data such that possession of a valid digital token (even if stolen) is sufficient to gain access to corresponding resources by presenting the token to a service provider. Thus, although shared secret based authentication techniques may be effective, there are some drawbacks associated with existing techniques.

SUMMARY

Bifurcated authentication token techniques are described. In one or more implementations, an authentication service is configured to separate sign-on credentials from corresponding privilege data for resources that support bifurcated authentication token techniques. In order to do so, the authentication service may make a determination in connection with authentication of a client as to whether a service provider is configured to support bifurcated authentication token techniques. If the techniques are supported, a lightweight token is issued to the client and corresponding privilege data is stored in a centralized authentication database from which service providers may look-up privilege data. If, on the other hand, a service provider does not support bifurcated authentication token techniques, a traditional, combined authentication token to the client that includes privilege data is issued to the client.

The lightweight token used for bifurcated authentication token techniques may be configured to contain identity information and a link/reference to the privilege data, but does not contain the actual privilege data. Therefore, the lightweight cookie token alone is not sufficient to gain access to corresponding resources. Moreover, privileges associated with a lightweight token may be revoked or altered by changing the privilege data in the centralized authentication database and without having to change or invalidate the lightweight token itself.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Traditionally, authentication techniques may rely upon shared secrets such as passwords and/or digital tokens (e.g. ticket granting tickets TGTs, encrypted blobs, cookies, or other sign-on credentials). However, shared secrets and digital tokens can be stolen or compromised. Additionally, tokens may be issued with long validity periods over which access rights my change. Moreover, traditional tokens may include both identity and privilege data such that possession of a valid digital token (even if stolen) is sufficient to gain access to corresponding resources by presenting the token to a service provider.

Bifurcated authentication token techniques are described. In one or more implementations, an authentication service is configured to separate sign-on credentials from corresponding privilege data for resources and service providers that support bifurcated authentication token techniques. In order to do so, the authentication service may make a determination in connection with authentication of a client as to whether a service provider associated with a resource the client is attempting to access is configured to support bifurcated authentication token techniques. If the bifurcated authentication token techniques are supported, a lightweight token (e.g., a cookie) is issued to the client and corresponding privilege data is stored in a centralized authentication database from which service providers may look-up the privilege data. If, on the other hand, a service provider does not support bifurcated authentication token techniques, a traditional, combined authentication token that includes privilege data is issued to the client.

The lightweight token used for bifurcated authentication token techniques may be configured to contain identity information and a link/reference to the privilege data, but does not contain the actual privilege data. Therefore, the lightweight token alone is not sufficient to gain access to corresponding resources. As the lightweight token does not contain privilege data, the lightweight token may have a size that is significantly smaller than traditional, combined tokens. Moreover, privileges associated with a lightweight token may be revoked or altered by changing the privilege data in the centralized authentication database and without having to change or invalidate the lightweight token itself.

In the discussion that follows, a section titled "Operating Environment" is provided and describes one environment in which one or more embodiments can be employed. Following this, a section titled "Bifurcated Authentication Token Examples" describes example techniques and details in accordance with one or more implementations. Last, a section titled "Example System" describes example computing systems and devices that can be utilized in one or more implementations.

Operating Environment

Figure 1:
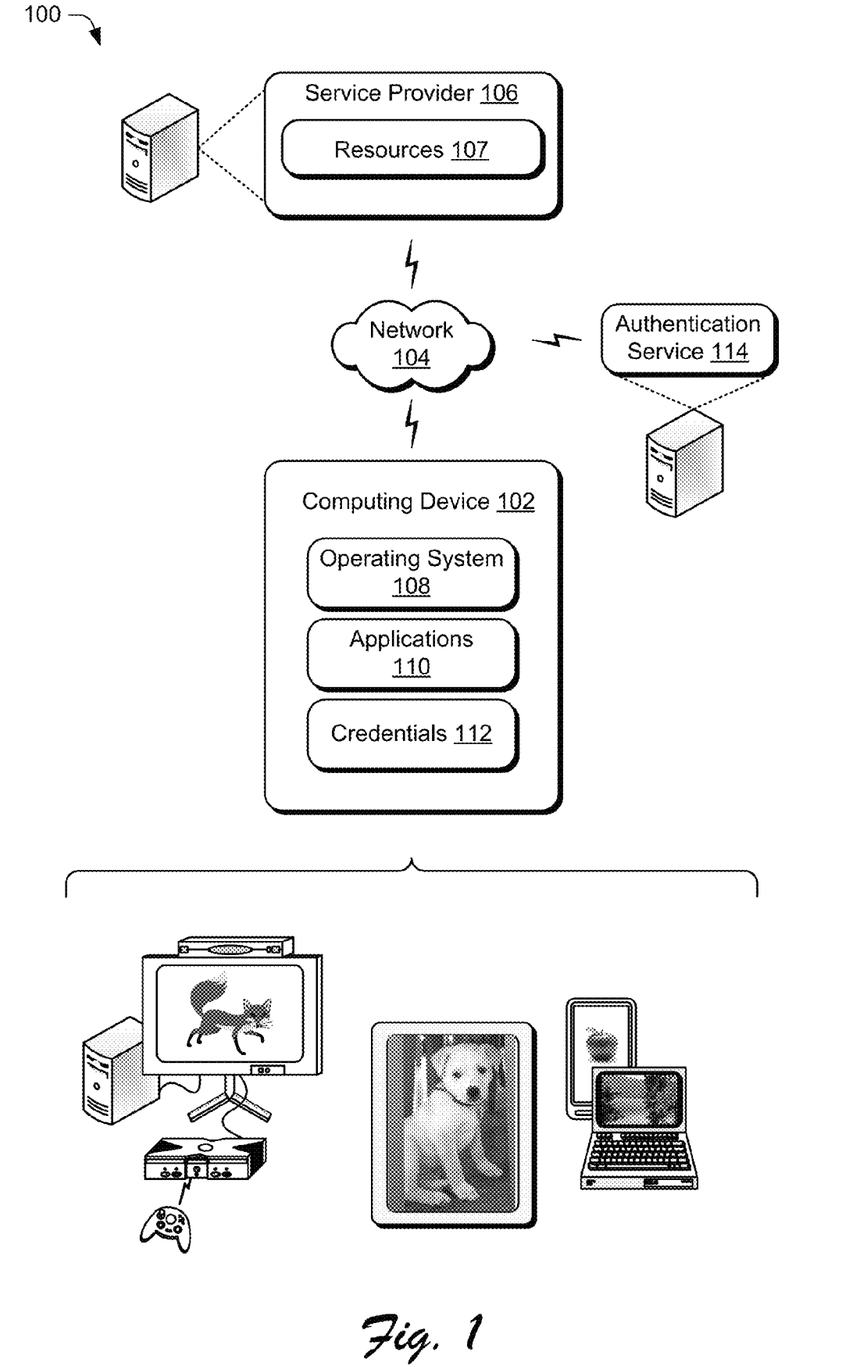
FIG. 1 illustrates an example operating environment in which bifurcated authentication token techniques may be employed.

FIG. 1 illustrates an operating environment in accordance with one or more embodiments, generally at 100. The environment 100 includes a computing device 102 that is communicatively coupled over a network 104 to a service provider 106. The computing device may be configured in various ways to access and interact with various resources 107 (e.g., content and services) that are made available by the service provider over the network 104. Resources 107 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

The computing device is also depicted as including an operating system 108 and one or more applications 110 that may reside on computer-readable media and which are executable by a processing system of the computing device. The processing system may be configured in various way to retrieve and execute computer-program instructions from applications 110 to provide a wide range of functionality to the computing device 102, including but not limited to access to local resources available from the operating system 108, gaming, office productivity, email, media management, printing, networking, web-browsing to access resources 107, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, and the like. For example, the computing device 102 can be implemented as a television client device, a computer, and/or a gaming system that is connected to a display device to display media content. Alternatively, the computing device may be any type of portable computer, mobile phone, portable device, tablet or slate device, and/or may include an integrated display. Any of the computing devices can be implemented with various components, such as one or more processors and memory devices, as well as with any combination of differing components. One example of a computing system that can represent various systems and/or devices including the computing device 102 is shown and described below in FIG. 7.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 7.

Bifurcated authentication token techniques described herein may be used to control client access to either or both of local accounts and web-based accounts. The computing device for instance may be employed by a user to attempt a log-in to a user account by asserting credentials 112 that may be verified via an authentication service 114 as part of the authentication sequence. Accordingly, the authentication service 114 represents functionality operable to resolve a user's identity to control access to the resources 107. The authentication service 114 may be provided by a service provider 106 from which resources 107 are sought, as a standalone service (as illustrated), or otherwise. The authentication service 114 may implement an authentication sequence using various protocols to determine that a user seeking access to resources is who they claim to be and/or are authorized to access the resources. Example authentication protocols that may be utilized include but are not limited to Kerberos, Active Directory Federation Services (ADFS), and Host Identity Protocol (HIP), to name a few.

The authentication service 114 may verify the asserted credentials 112 against credentials (e.g., user ID, password, key, shared secret, etc.) that are maintained in association with accounts as part of user account data. When the authentication is successful (e.g., the client "is who they say they are"), the authentication service may issue a token(s) (e.g., TGTs, encrypted blobs, cookies, and/or other suitable sign-on credentials) to enable access to corresponding resources. In an implementation, the authentication service 114 may be configured to support traditional, combined token techniques as well as bifurcated authentication token techniques in which privilege data is separated from a corresponding token, e.g., a lightweight token. A single authentication may correspond to one or more resources 107, such that authentication to a single account by a "single sign-on" may provide access to individual resources, resources from multiple service providers 106, and/or to an entire suite of resources available from a service provider 106. Thus, upon successful verification of the credentials 112, the computing device may be logged-in to a user account and therefore may be given access to resources 107 authorized for the account. If the authentication service is unable to verify the credentials, access to the resources 107 is denied, a prompt to retry authentication may be output, and so forth.

Having described an example operating environment, consider now example details regarding input challenge based authentication in accordance with one or more embodiments.

Bifurcated Authentication Token Examples

In the following section, implementation details and example techniques for bifurcated authentication token techniques are discussed. The discussion includes some an example procedure(s) that can be implemented in connection with any suitable hardware, software, firmware, or combination thereof. In at least some embodiments, the procedures may be implemented by way of a suitably configured computing device that includes or otherwise makes use of an authentication service 114. Aspects of the procedure may also be implemented by a computing device 102 and/or by functionality that is distributed between a service provider 106 and a computing device 102.

Example Interaction Scenarios

Figure 2:
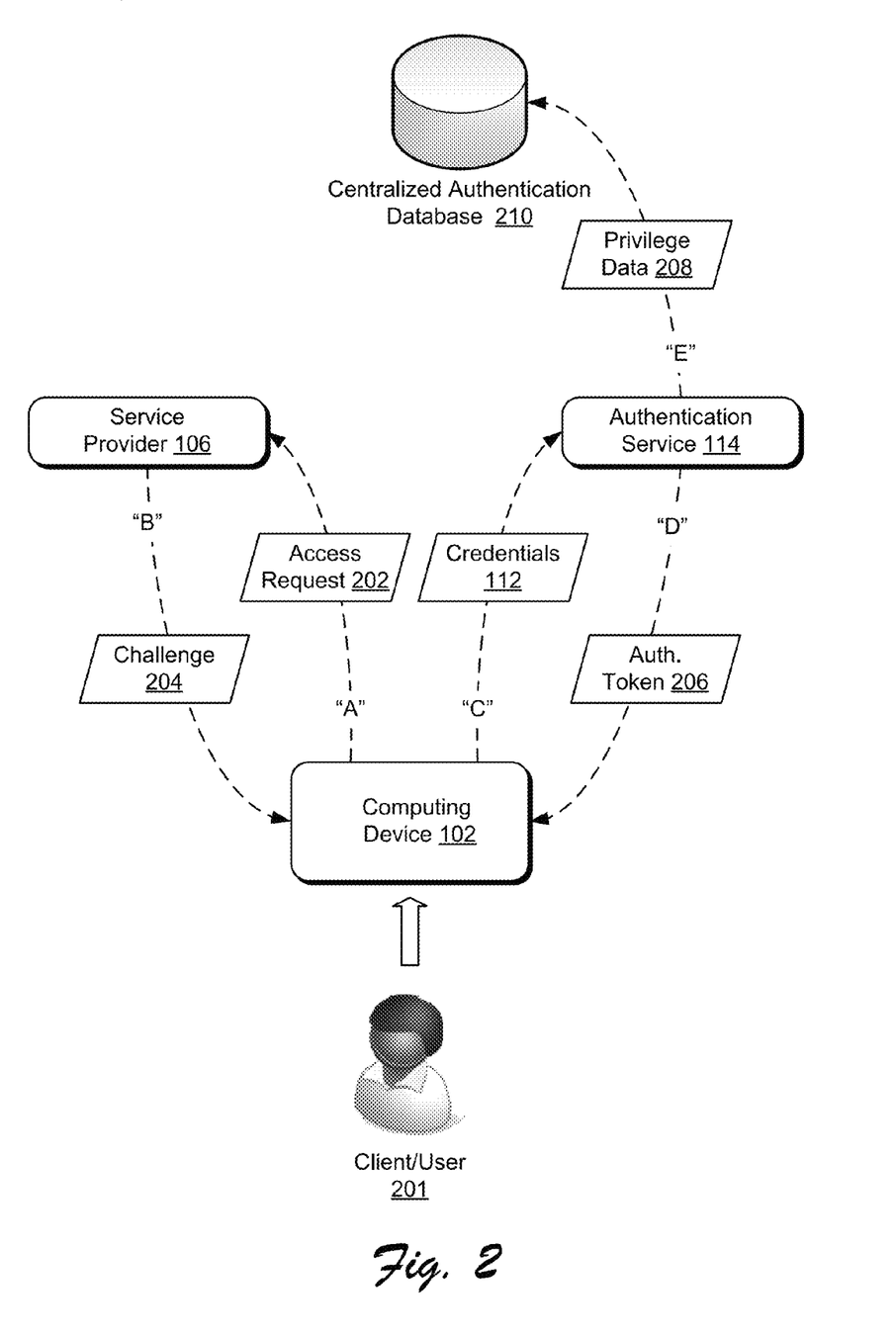
FIG. 2 is a diagram showing an example interaction scenario to issue tokens in accordance with one or more implementations.

FIG. 2 depicts generally at 200 an example interaction scenario in which authentication tokens are issued to a client. In particular, the example interaction scenario represents operations that may be performed by one or more components of the example operating environment 100 of FIG. 1 that are labeled using letters "A" to "E". For example, at "A" a client/user 201 may operate a computing device 102 to form an access request 202 to obtain resources 107 from a service provider 106. For instance, a browser may be navigated to a particular website and/or web service made accessible by the service provider 106 over a network 104. In response to the access request 202, the service provider 106 at "B" may issue a challenge 204 for user authentication, which initiates an authentication sequence. In some implementations, the service provider 106 may incorporate an authentication service 114 to perform authentication of client/users 201 on its own behalf. In addition or alternatively, the service provider 106 may configure the challenge 204 to cause redirection of the computing device to an external and/or third party authentication service 114 operable to perform authentications on behalf of one or more service providers 106 for access to corresponding resources.

As part of the authentication sequence, the client/user 201 may be presented with a log-in page or other suitable interface associated with the authentication service 114 that provides a prompt to input credentials 112 for authentication. At "C", the computing device 102 may communicate credentials 112 supplied by the client/user in response to the prompt to the authentication service 114 for verification. Credentials 112 may be for example a user ID and password combination. Other types of authentication schemes and corresponding types of credentials are also contemplated, such as the use of picture based challenges, an established input pattern, a touch gesture combination, biometric authentication, a code, and so forth. As noted, the authentication service 114 may verify the asserted credentials 112 by checking them against known credentials that are maintained in association with accounts as part of user account data. Further, the authentication service 114 may be configured to support traditional, combined token techniques as well as bifurcated authentication token techniques in which privilege data is separated from a corresponding token (e.g., a lightweight token).

Thus, upon successful authentication of credentials 112 by the authentication service 114, the authentication service 114 at "D" may issue at least one authentication token 206 and communicate the authentication token(s) 206 back to the computing device 102 for use to access corresponding resources. Authentication tokens 206 may be configured as various kinds of tokens such as ticket granting tickets TGTs, encrypted blobs, cookies, or other suitable sign-on credentials used in connection with various authentication protocols. As discussed in detail above and below, the authentication service 114 may further operate to make determination on a resource by resource and/or provider by provider by provider bases whether to issue e.g., lightweight tokens (e.g., when bifurcated authentication token techniques are supported) or traditional type combined tokens (e.g., for providers and resources that do not support bifurcated authentication token). In order to identify and distinguish between providers/resources that support bifurcated authentication tokens and those that do not, the authentication service 114 may reference suitable data such as a table, database, file, list, or other data structure having properties, fields, and/or metadata indicative of whether or not particular providers/resources support bifurcated authentication. The authentication service 114 may then selectively provide authentication tokens in different formats based upon the determinations of support.

Accordingly, authentication tokens 206 issued by the authentication service 114 may or may not be configured to contain corresponding privilege data 208. The privilege data 208 is configured to indicate access privileges that are granted to clients/users through corresponding accounts. In other words, the privilege data 208 provides indications of resources and/or service providers with which a client/user is permitted to interact. Privilege data 208 may also include an indication of a designated validity time period for which the token is valid, which may be on the order of hours, days, or weeks. Privilege data 208 may further encompass various other metadata such as preferences, group memberships, context indications, location indications, language selections, identity claims, service levels, device capabilities, and so forth.

In traditional tokens, the privilege data 208 may be combined with identity information within a granted token. For example, privilege data 208 may be encrypted within a Kerberos based token as a privilege attribute certificate (PAC) and/or in other suitable ways for different authentication protocols. A service provider may therefore utilize a token that contains privilege data 208 directly to identify a user and extract corresponding access privileges to control access to resource 107. This approach does not involve having to look-up privileges from a source other than the presented token. One drawback to this approach, however, is that during the validity time period a token, even if comprised or stolen, is sufficient to gain access to corresponding resources by presenting the token to a service provider. Since the combined token is essentially self-contained, it may also be difficult to revoke or change associated privileges. Additionally, embedding privilege data 208 within the token increases the size of the token and in some cases may result in exceeding bandwidth or size limits placed upon headers, token size, and/or network traffic.

Thus, in accordance with bifurcated authentication token techniques, the authentication service 114 may be configured to separate privilege data 208 from issued tokens and store the privilege data at a network accessible storage location, such as in a centralized authentication database 210 as represented in FIG. 2. The centralized authentication database 210 may be representative of a centralized and/or replicated repository for client/user account data including privilege data 208. The centralized authentication database 210 may be configured as an integrated component of the authentication service 114 or alternatively may be provided as a standalone service implemented by the same or a different server(s) and/or provider(s) (e.g., an external service).

For example, at "E" privilege data 208 associated with an issued token is represented as being communicated for storage at the centralized authentication database 210. In this example, the authentication token 206 issued at "D" may be configured as a lightweight token that does not contain privilege data 208. Rather, the lightweight token may be configured to contain a link, URL, address, or other reference to the network accessible storage location from which service providers may obtain corresponding privilege data 208. In one approach, the lightweight token may be configured as a relatively small cookie that includes the reference to the network accessible storage. The reference is usable by a service provider to look-up privilege data associated with the client from the centralized authentication database 210 (or other storage location). The lightweight token, though, does not contain privilege data sufficient to enable the service provider to determine resources that the client is authorized to use without a look-up from the centralized authentication database. Thus, generally speaking, combined authentication tokens do and lightweight tokens do not contain information sufficient to enable a determination by service providers regarding access privileges of the clients without reliance upon external information.

Privileges associated with an issued lightweight token may be revoked or changed by modifying privilege data 208 maintained at the centralized authentication database 210. This modification of privileges may occur without altering the lightweight token or affecting the validity of the lightweight token. In other words, privileges may be changed while a token remains valid and the token is subsequently usable to access resources in accordance with modified privilege. Little or no delay exists between modifying privileges and enforcement of the access privileges when a token is presented. Moreover, the privilege changes take effect without having to re-authenticate or issue a new authentication token to the user/client.

Figure 3:
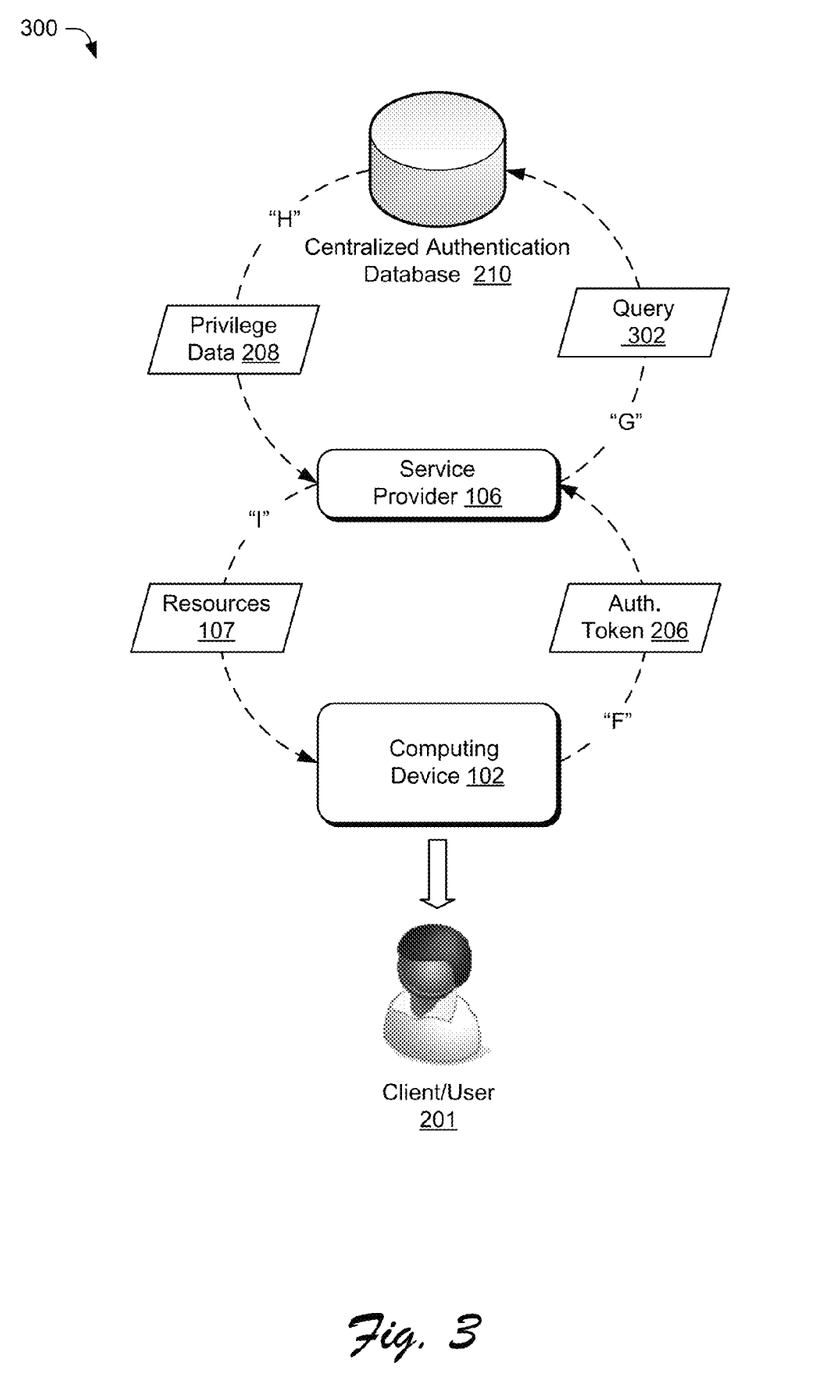
FIG. 3 is a diagram showing an example interaction scenario in which tokens are employed to control access to resources in accordance with one or more implementations.

FIG. 3 depicts generally at 300 an example interaction scenario in which tokens are employed to control access to resources in accordance with one or more implementations. In particular, the example interaction scenario represents operations that may be performed by one or more components of the example operating environment 100 of FIG. 1 that are labeled using letters "F" to "I". After obtaining an authentication token 206 in the manner just described in relation to FIG. 2, a client/user 201 may navigate to access various resources available from service providers 106. For example, the computing device 102 may be operated to form an access request. At "F" the authentication token 206 may be communicated as part of the access request and/or in response to a prompt from the provider to supply the authentication token 206. For the purpose of this example, assume the authentication token 206 is a lightweight token as described herein that does not include privilege data 208.

Accordingly, the service provider 106 in this example may be "a bifurcated authentication token aware provider" that is configured to recognize and handle lightweight tokens in addition to or in lieu of traditional combined tokens. By way of example, the service provider 106 may detect that the token is a lightweight token based upon identifying data included with the token such as a header field, a code, a token format, a reference or link to the privilege data within the token, absence of privilege data within the token, and so forth. Responsive to detecting a lightweight token, the service provider 106 is configured to perform operations to fetch full privilege data 208 corresponding to the token.

In particular, the service provider 106 may parse the token to extract a link or other reference to the centralized authentication database 210 (or other designated storage locations). At "G", the service provider utilizes the extracted link/reference to form a query 302 and then communicates the query 302 to the centralized authentication database 210 to look-up corresponding privilege data 208. In response to the query 302, the service provider at "H" obtains the privilege data 208, which may be used to control access to resources 107 as specified by the privilege data 208. Upon verification that a client/user is permitted to access requested resources according to the privilege data 208, the service provider 106 at "I" enables access to the resources 107 and the computing device 102 is able to interact with the resources 107. Additional details regarding these and other aspects of bifurcated authentication token techniques are discussed in relation to the example procedures that follow.

Example Procedures

Figure 4:
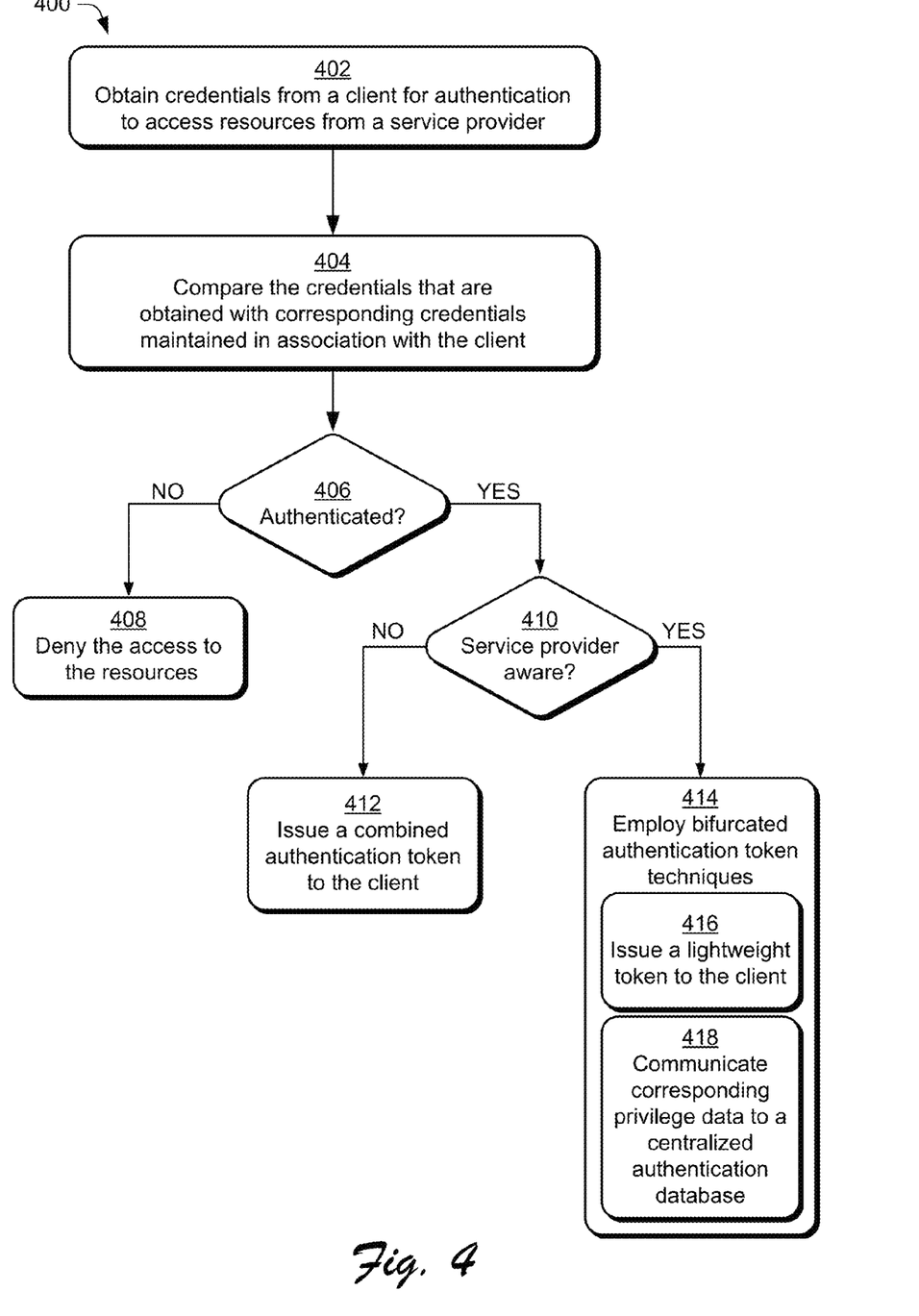
FIG. 4 is a flow diagram that describes details of an example procedure in which an authentication service selectively issues authentication tokens for access to resources.

FIG. 4 depicts an example procedure 400 in which an authentication service selectively issues authentication tokens for access to resources. Credentials are obtained from a client for authentication to access resources from a service provider (block 402). For example, a computing device 102 may be operated to supply credentials 112 (e.g., user ID and password or other authentication credentials) associated with a user/client in connection with an attempt to access resources from a service provider 106. The authentication service 114 is configured to use the supplied credentials to authenticate the client to access resources from the service provider. In order to do so, a comparison is made between the credentials that are obtained and corresponding credentials maintained in association with the client (block 404). Based on the comparison, a determination is made regarding whether the client is authenticated to gain access the resources (block 406). If the client is not authenticated, the access to the resources is denied (block 408). On the other hand, when authentication is successful, a determination is made regarding whether the service provider from which resources are sought is a bifurcated authentication token aware provider (block 410). In the case that the service provider is not aware, a combined authentication token is issued to the client (block 412). The combined authentication token is configured to include privilege data 208. For instance, privilege data may be encrypted within the combined authentication tokens 206 issued for service providers 106 and resources 107 that are not configured to support bifurcated token techniques. By way of example, the privilege data 208 may be embedded within a token using an encrypted PAC, data blob, or other suitable mechanism to include the privilege data with the token. As noted previously, the privilege data is configured to provide indications of resources from one or more service providers that the client is authorized to use upon successful authentication, as well as client identification information and other metadata. Because the combined token includes both client identification information and the privilege data, the combined authentication token enables a direct determination by the service provider of resources that the client is authorized to use.

When the service provider is aware, though, bifurcated authentication token techniques are employed (block 414). Here, a lightweight token is issued to the client (block 416) and corresponding privilege data is communicated to a centralized authentication database (block 418) for storage separately from the lightweight token. The lightweight token does not contain privilege data sufficient to enable the service provider to determine resources that the client is authorized to use without a look-up from the centralized authentication database. Instead, the lightweight token is configured to include a reference usable by the service provider to look-up privilege data associated with the client from the centralized authentication database. Privilege data may vary depending on one or more of the client's access rights, the type of resource being accessed, and/or additional contextual information in the lightweight token that is passed by the resource to the centralized authentication database. For instance, the reference may be an address, link, or URL for a storage location of the privilege data in the centralized authentication database. Access privileges associated with the lightweight token are controlled based on the privilege data stored in the centralized authentication database. Accordingly, possession of the lightweight cookie token alone is not sufficient to gain access to resources. Additionally, a change in access privileges associated with a lightweight token may be accomplished by modifying the corresponding privilege data stored in the centralized authentication database without having to revoke or change the lightweight token itself. Further details regarding techniques to modify privileges associated with a lightweight token are discussed below in relation to the example procedure of FIG. 6.

Because the lightweight token does not include full privilege data, the amount of information included in the lightweight token is substantially less than information that is included in the combined authentication token (e.g., complete privilege data). As such the lightweight token has a size that may be considerably smaller than a size of a corresponding combined authentication token. Consequently, the lightweight token may be easier to handle and transport as well as more likely to satisfy any bandwidth or token size constraints. Additionally, the relatively small size of the lightweight token may enable communication of the lightweight cookie in an uncompressed format in some scenarios, which is generally not possible with larger combined tokens that carry complete privilege data.

Figure 5:
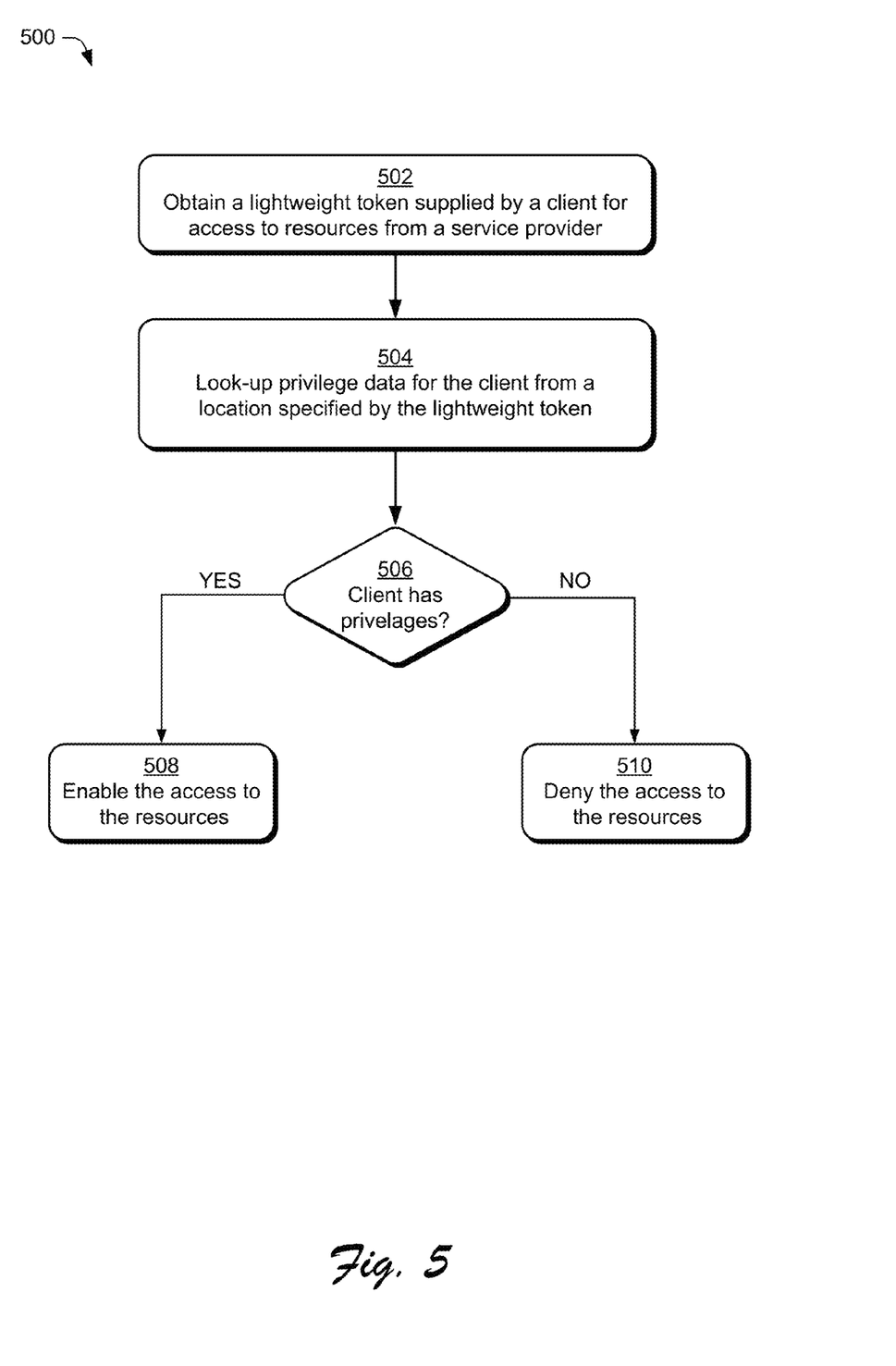
FIG. 5 is a flow diagram that describes details of an example procedure in which a service provider controls access to resources based upon a lightweight token.

FIG. 5 depicts an example procedure 500 in which a service provider controls access to resources based upon a lightweight token. A lightweight token is obtained that is supplied by a client for access to resources from a service provider (block 502). A client/user may obtain the lightweight token in accordance with the foregoing procedure 400 of FIG. 4 and example interaction scenario of FIG. 2. For example, a lightweight token may be issued to a client by an authentication service 114 configured to determine whether service providers 106 support bifurcated authentication token techniques. Based on such determinations, the authentication service 114 operates to: (1) issue lightweight tokens that do not include privilege data 208 for access to resources 107 from service providers 106 that support bifurcated authentication token techniques, and (2) issue combined authentication tokens that include privilege data 208 for access to resources 107 from service providers 106 that do not support bifurcated authentication token techniques.

During a validity time period established for a lightweight token, the lightweight token may be presented by the client/user in connection with an attempt to access resources from the service provider. The service provider is configured to recognize the presented token as a lightweight token and parse the token to extract a reference to a location at which corresponding privilege data is available. For example, the service provider may recognize the token as lightweight token based on various identifying data included with the token as described previously.

Once the service provider recognizes the token as a lightweight token, the service provider is configured to perform operations to obtain corresponding privilege data 208, which in accordance with bifurcated authentication token techniques described herein is kept separate from the lightweight token itself. Instead of including privilege data with a token, the lightweight token is linked to the privilege data associated with the client via a reference to a storage location for the privilege data, such as in a centralized authentication database as described herein. The service provider uses this reference to look-up privilege data for the client from the location specified by the lightweight token (block 504). For instance, the lightweight cookie token alone is insufficient to enable the service provider to determine resources that the client is authorized to use without the looking-up of the privilege data from the location specified by the lightweight cookie token. Accordingly, access to resources is selectively controlled by the service provider based on the privilege data that the service provider looks-up.

In particular, the service provider ascertains whether the client has privileges to access resources (block 506) in accordance with the privilege data maintained at the location indicated in the lightweight token. For example, the service provider may interact with the centralized authentication database to look-up group memberships, resource authorizations, service levels, and/or other privileges of clients with respect to resources that are reflected by privilege data 208. When the client has privileges for particular resources, access to those individual resources is enabled (block 508). On the other hand, when the client does not have privileges for some resources, access to these resources is denied (block 510).

Note that the bifurcated authentication token techniques may also be employed for referrals between different domains or segments of a domain. Within a trust boundary for a set of domains that use the same authentication database (e.g., a domain forest) a lightweight token may be issued or transferred to the referral domain (as long as the resource supports the bifurcated approach) to enable access privilege data. Additionally, the bifurcated authentication token techniques may be applied to resources and domains across trust boundaries that may have separate authentication databases and privilege data, such as in the case of Active Directory domain forests. In such cross-boundary referral situations, a lightweight token may not work between domain forests if privilege data changes across the trust boundary. In order to handle these situations, a combined authentication token containing full privilege data may be issued across the trust boundary. Within the separate domains, though, lightweight tokens and bifurcated techniques may be used for resources within the trust boundaries as well as for referrals leading up to the root domain of one forest, and after the forest trust boundary is crossed, down to the resources in the referral domain in the manner described herein.

Figure 6:
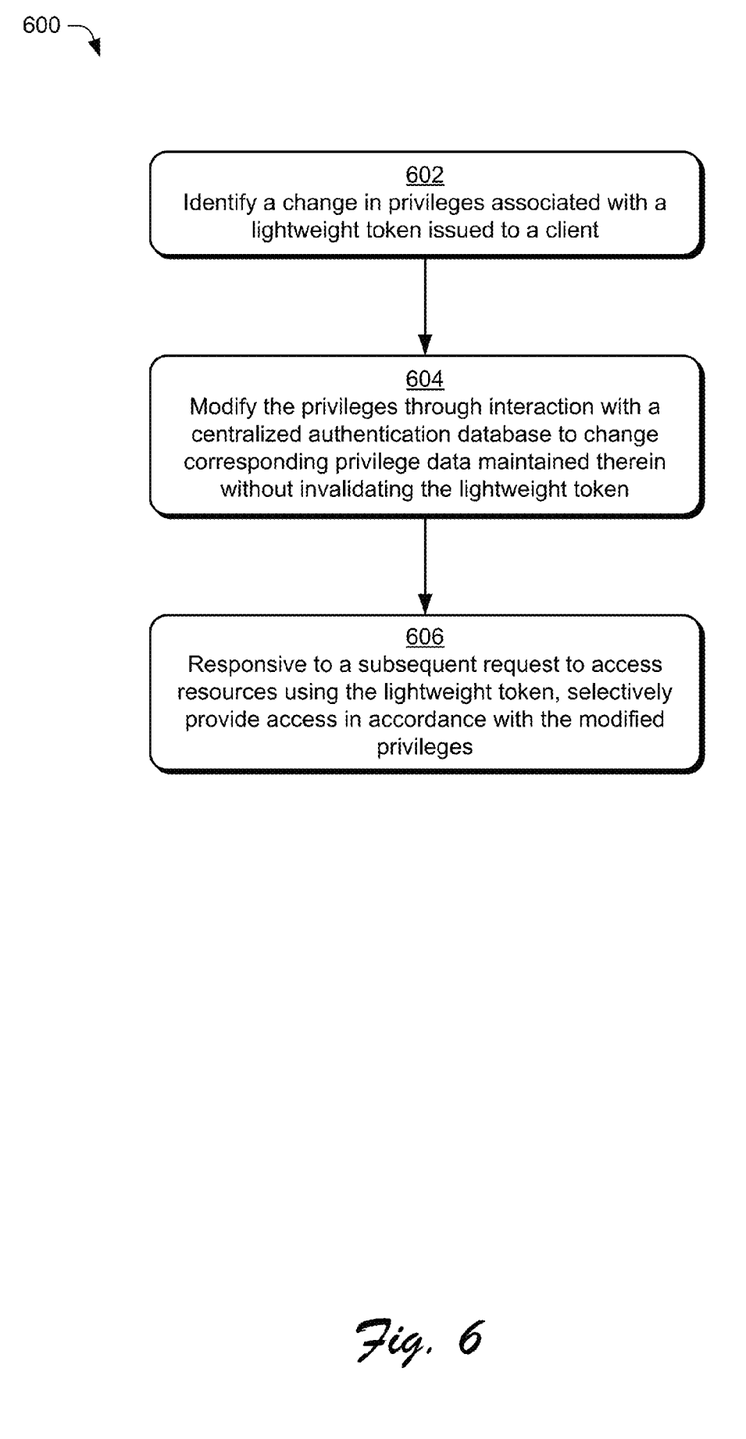
FIG. 6 is a flow diagram that describes details of an example procedure in which privileges associated with a lightweight token are modified.

FIG. 6 depicts an example procedure 600 in which privileges associated with a lightweight token are modified. A change is in privileges associated with a lightweight token issued to a client is identified (block 602). Changes in privileges may be initiated in various ways. For example, a user or administrator may alter membership of a corresponding account in various groups that have different privileges. Further, a user may sign-up for different service levels and/or existing service authorizations may expire. These and other actions may cause a corresponding change in privileges for a client/user. An authentication service 114 and/or service providers may be configured to detect and/or obtain notifications of changes in privileges.

In response to the identification of changes, privileges are modified through interaction with a centralized authentication database to change corresponding privilege data maintained therein without invalidating the lightweight token (block 604). Then, responsive to a subsequent request to access resources using the lightweight token, access is selectively provided in accordance with the modified privileges (block 606). For example, in accordance with techniques discussed herein, privileges may be modified via privilege data 208 that is kept separate from lightweight tokens without altering data or validity of lightweight tokens that are already issued for an account. Accordingly, clients/users may continue to use the lightweight tokens as long as they are valid and associated access rights will change substantially in "real-time" as changes are made to corresponding privilege data 208 that is separated from lightweight tokens. Moreover, rights may be revoked quickly and easily by changing the privilege data. For example, privileges associated with a token may be wiped from the centralized authentication database 210 thereby rendering the token useless even if the token is still valid (e.g., the validity time period has not expired). Thus, comprised tokens may be revoked simply by updating the privilege data at the centralized authentication database 210.

Having considered example details and techniques regarding input bifurcated authentication token techniques, consider a discussion of an example system in accordance with one or more implementations.

Example System

Figure 7:
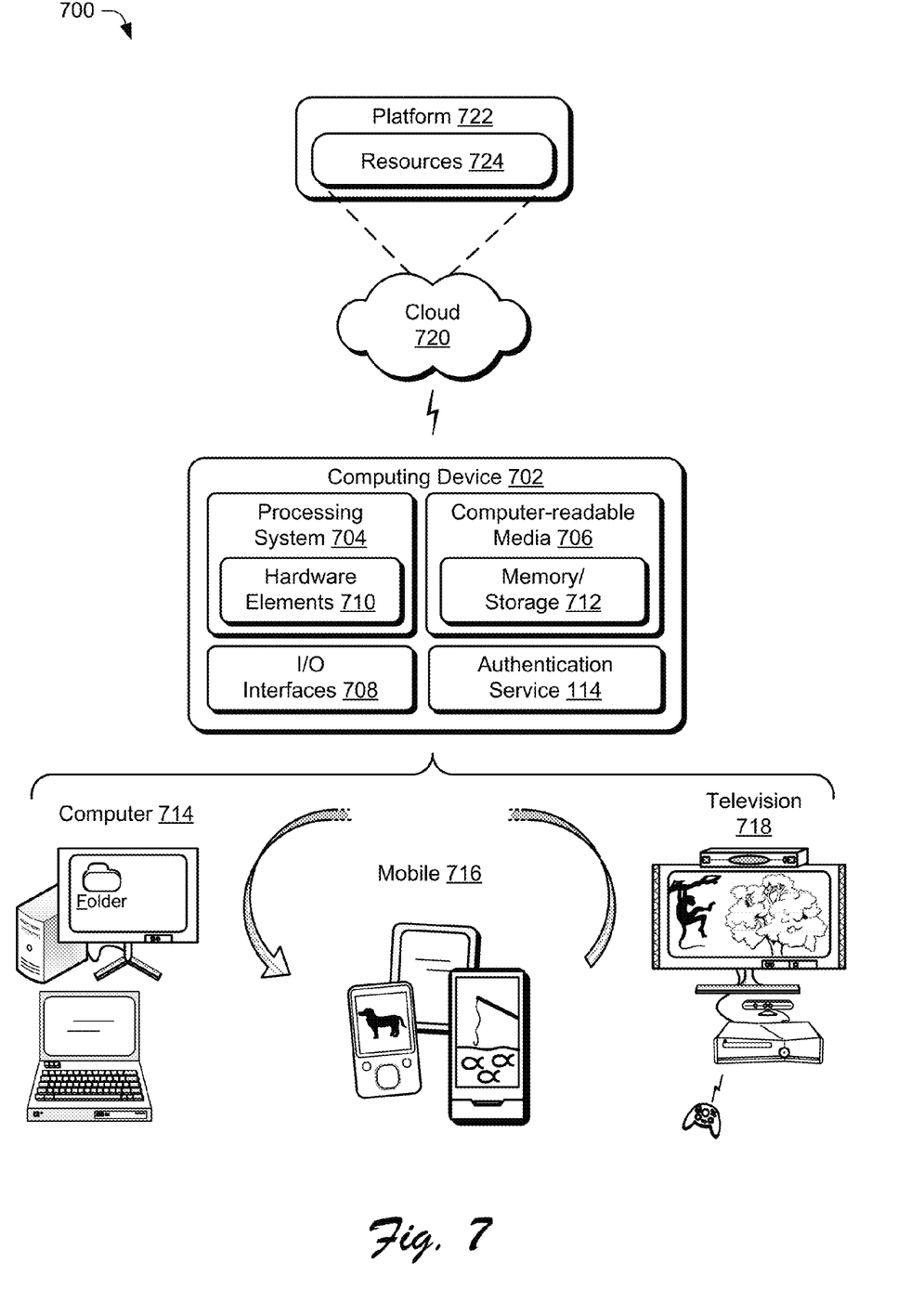
FIG. 7 is a block diagram of a system showing details of example devices and components in accordance with one or more implementations.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, authentication service 114, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the authentication service 114 on the computing device 702. The functionality represented by the authentication service 114 and other modules/applications may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented by a computing device comprising:
   authenticating a client to access resources from a service provider;
   in connection with authentication of the client, determining whether the service provider is configured to support bifurcated authentication token techniques; and
   based on the determination:
      issuing a combined authentication token to the client that includes privilege data associated with the client when the service provider is not configured to support bifurcated authentication token techniques, the combined authentication token containing information sufficient to provide indications to service providers regarding access privileges of clients without reliance upon external information; or
      issuing a lightweight token to the client and communicating the privilege data associated with the client for storage in a centralized authentication database separate from the service provider when the service provider is configured to support bifurcated authentication token techniques, the lightweight token configured to contain identity information and a reference to enable look-up of the privilege data from the centralized authentication database instead of containing the privilege data itself.

2. The method as recited in claim 1, wherein authenticating the client comprises obtaining credentials from the client for authentication and comparing the credentials with corresponding credentials maintained in association with the client.

3. The method as recited in claim 1, wherein the privilege data provides indications of resources from one or more service providers that the client is authorized to use upon successful authentication.

4. The method as recited in claim 1, further comprising encrypting the privilege data within the combined authentication token when the service provider is not configured to support bifurcated token techniques.

5. The method as recited in claim 1, wherein the reference to the privilege data comprises a link to the centralized authentication database.

6. The method as recited in claim 1, wherein the reference is an address of a storage location for the privilege data associated with the centralized authentication database.

7. The method as recited in claim 1, wherein the combined authentication token issued when the service provider is not configured to support bifurcated token techniques includes both client identification information and the privilege data that enables a direct determination by the service provider of resources that the client is authorized to use.

8. The method as recited in claim 1, wherein the lightweight token issued when the service provider is configured to support bifurcated token techniques does not contain privilege data sufficient to enable the service provider to determine resources that the client is authorized to use without the look-up from the centralized authentication database.

9. The method as recited in claim 1, wherein information included in the lightweight token is less than information included in the combined authentication token such that lightweight token has a size that is smaller than a size of the combined authentication token.

10. The method as recited in claim 9, wherein the size of the lightweight token enables communication of the lightweight token in an uncompressed format.

11. The method as recited in claim 1, wherein access privileges associated with the lightweight token are controlled based on privilege data stored in the centralized authentication database such that possession of the lightweight token alone is not sufficient to gain access to resources.

12. The method as recited in claim 1, further comprising changing access privileges associated with the lightweight token by modifying privilege data stored in the centralized authentication database without revoking the lightweight token itself.

13. A method implemented by a computing device comprising:
    obtaining from a client a lightweight token supplied for access to resources from a service provider, the lightweight token configured not to include privilege data associated with the client, the lightweight token configured to contain identity information and a reference to the privilege data for the client that links the lightweight token to a location specified for storage of the privilege data within an authentication database, the privilege data providing indications of resources with which the client is permitted to interact;
    looking-up the privilege data for the client from the location specified by the reference contained in the lightweight token;
    ascertaining whether the client has privileges to access the resources according to the privilege data that is looked-up; and
    controlling access to the resources according to the privileges including:
        when the client has privileges to access the resources, enabling access to the resources; or
        when the client does not have privileges to access the resources, denying access to the resources.

14. The method as recited in claim 13, wherein the lightweight token is issued to the client by an authentication service configured to determine whether service providers support bifurcated authentication token techniques, issue lightweight tokens that do not include privilege data for access to resources from service providers that support bifurcated authentication token techniques and issue combined authentication tokens that include privilege data for access to resources from service providers that do not support bifurcated authentication token techniques.

15. The method as recited in claim 13, wherein the lightweight token is insufficient to enable the service provider to determine resources that the client is authorized to use without the looking-up of the privilege data from the location specified by the lightweight token.

16. A system comprising:
    one or more processors; and
    one or more computer-readable storage media storing instructions that, when executed by a computing device, implement an authentication service configured to perform acts comprising:
        in connection with authentication of clients to access resources from service providers, determining whether service providers support bifurcated authentication token techniques;
        issuing combined authentication tokens that include privilege data to clients for access to resources from service providers that do not support bifurcated authentication token techniques, the combined authentication tokens containing information sufficient to provide indications to service providers regarding access privileges of clients without reliance upon external information; and
        issuing lightweight tokens that do not include privilege data to clients for access to resources from service providers that support bifurcated authentication token techniques, the lightweight tokens configured to contain identity information and references that enable look-ups to obtain corresponding privilege data for the clients from specified storage locations associated with authentication service.

17. The system of claim 16, wherein the authentication service is further configured to perform acts comprising:
    configuring the lightweight tokens to include the references as links to the specified storage locations of corresponding privilege data for the clients within a centralized authentication database implemented by the authentication service.

18. The system of claim 17, wherein the authentication service is further configured to perform acts comprising:
    identifying a change in privileges associated with a lightweight token issued to a particular client;
    modifying the privileges through interaction with the centralized authentication database to change corresponding privilege data maintained therein without invalidating the lightweight token.

19. The system of claim 16, wherein the lightweight tokens do not contain information sufficient to enable a determination by the service providers regarding access privileges of the clients without reliance upon external information.

20. The system of claim 16, wherein the lightweight tokens have sizes that enable communication of the lightweight tokens in an uncompressed format.

* * * * *